United States Patent [19]

Furusawa

[11] Patent Number: 5,777,972
[45] Date of Patent: Jul. 7, 1998

[54] OPTICAL HEAD DEVICE

[75] Inventor: Kouji Furusawa, Tokyo, Japan

[73] Assignee: NEC Corporation, Tokyo, Japan

[21] Appl. No.: 834,165

[22] Filed: Apr. 14, 1997

[30] Foreign Application Priority Data

Apr. 15, 1996 [JP] Japan .................... 8-092161

[51] Int. Cl.⁶ ............................................ G11B 7/00
[52] U.S. Cl. .................... 369/112; 369/44.14; 369/44.22
[58] Field of Search .................... 369/44.14, 112, 369/44.21, 44.19, 44.22

[56] References Cited

U.S. PATENT DOCUMENTS

| | | | |
|---|---|---|---|
| 5,243,584 | 9/1993 | Kang | 369/44.14 |
| 5,265,079 | 11/1993 | Getreuer et al. | 369/44.14 |
| 5,289,445 | 2/1994 | Luecke | 369/44.15 |
| 5,455,811 | 10/1995 | Tanaka | 369/44.14 |

*Primary Examiner*—Tod R. Swann
*Assistant Examiner*—Kim-Kwok Chu
*Attorney, Agent, or Firm*—Whitham, Curtis & Whitham

[57] ABSTRACT

Disclosed is an optical head device, which has: an optical head for emitting a light beam to an optical disk; a head holder for holding the optical head; a base member which reciprocatively moves the head holder along a radius direction of the optical disk while holding the head holder rotatable around an axis approximately along a tangential line to a track of the optical disk; a rotation energizing means for energizing the rotation of the head holder; and an inclination detecting means for detecting an emission angle of the light beam to a recording surface of the optical disk; wherein the head holder has a center axis for its rotation which passes through near a center of gravity of the entire composition of the head holder including the optical head.

4 Claims, 4 Drawing Sheets

OPTICAL HEAD DEVICE

FIELD OF THE INVENTION

This invention relates to an optical head device, and more particularly to, an optical head device which is used for optical disk devices.

BACKGROUND OF THE INVENTION

A conventional optical head device is disclosed in, for example, Japanese patent application laid-open No. 4-344329(1992).

The optical head device comprises an optical head which emits a light beam to an optical disk, a head holder for holding the optical head, a sled base which holds the head holder rotatable around an axis approximately along the tangential line to a track of the optical disk and which functions as a base which reciprocatively moves along the radius direction of the optical disk, a tilt-driving voice coil motor which energizes the rotation of the head holder and an inclination detecting means which detects an emission angle of a light beam to the recording surface of the optical disk.

Meanwhile, if a resistive component such as friction force is neglected, a torque T required to rotate the head holder is generally given by:

$$T=(J+mr2)\cdot d^2\theta/dt^2 \qquad (1),$$

where J represents a moment of inertia around an axis that passes through the center of gravity of the whole head holder including the optical head etc. and is parallel to the rotation axis, m represents a mass of the head holder including the optical head etc., r represents a distance between the center of gravity and the rotation axis, and $d^2\theta/dt^2$ represents an angular velocity of the rotation.

However, in the conventional optical head device, since the rotation axis lies at one end of the head holder and the rotation movement is energized by the tilt-driving voice coil motor at the other end of the head holder, the distance r between the center of gravity and the rotation axis is increased, thereby increasing the torque T required to rotate the head holder, i.e., requiring a high output of the tilt-driving voice coil motor. Thus, the tilt-driving voice coil motor in the conventional optical head device has been charged with an increased load.

Furthermore, in the conventional optical head device, since the entire composition including the head holder has a low resonance frequency and the head holder is therefore required to rotate at a low frequency, the head holder is prevented from having a quick rotation movement.

These problems are caused by that the moment of inertia of the moving elements including the optical head and the coil of the tilt-driving voice coil motor, which are loads to the tilt-driving voice coil motor, becomes big since the optical head and the tilt-driving voice coil motor lie biasedly on the same side of the head holder apart from the rotation axis supporting the head holder.

SUMMARY OF THE INVENTION

Accordingly, it is an object of the invention to provide an optical head device in which the moment of inertia of all moving elements including an optical head and tilt-driving means can be significantly reduced.

According to the invention, an optical head device, comprises:

an optical head for emitting a light beam to an optical disk;

a head holder for holding the optical head;

a base member which reciprocatively moves the head holder along a radius direction of the optical disk while holding the head holder rotatable around an axis approximately along a tangential line to a track of the optical disk;

a rotation energizing means for energizing the rotation of the head holder; and an inclination detecting means for detecting an emission angle of the light beam to a recording surface of the optical disk;

wherein the head holder has a center axis for its rotation which passes through near a center of gravity of the entire composition of the head holder including the optical head.

BRIEF DESCRIPTION OF THE DRAWINGS

The invention will be explained in more detail in conjunction with the appended drawings, wherein.

DESCRIPTION OF THE PREFERRED EMBODIMENTS

Before explaining an optical head device in the preferred embodiment, the aforementioned conventional optical head device will be explained in FIG. 1.

Figure 1:
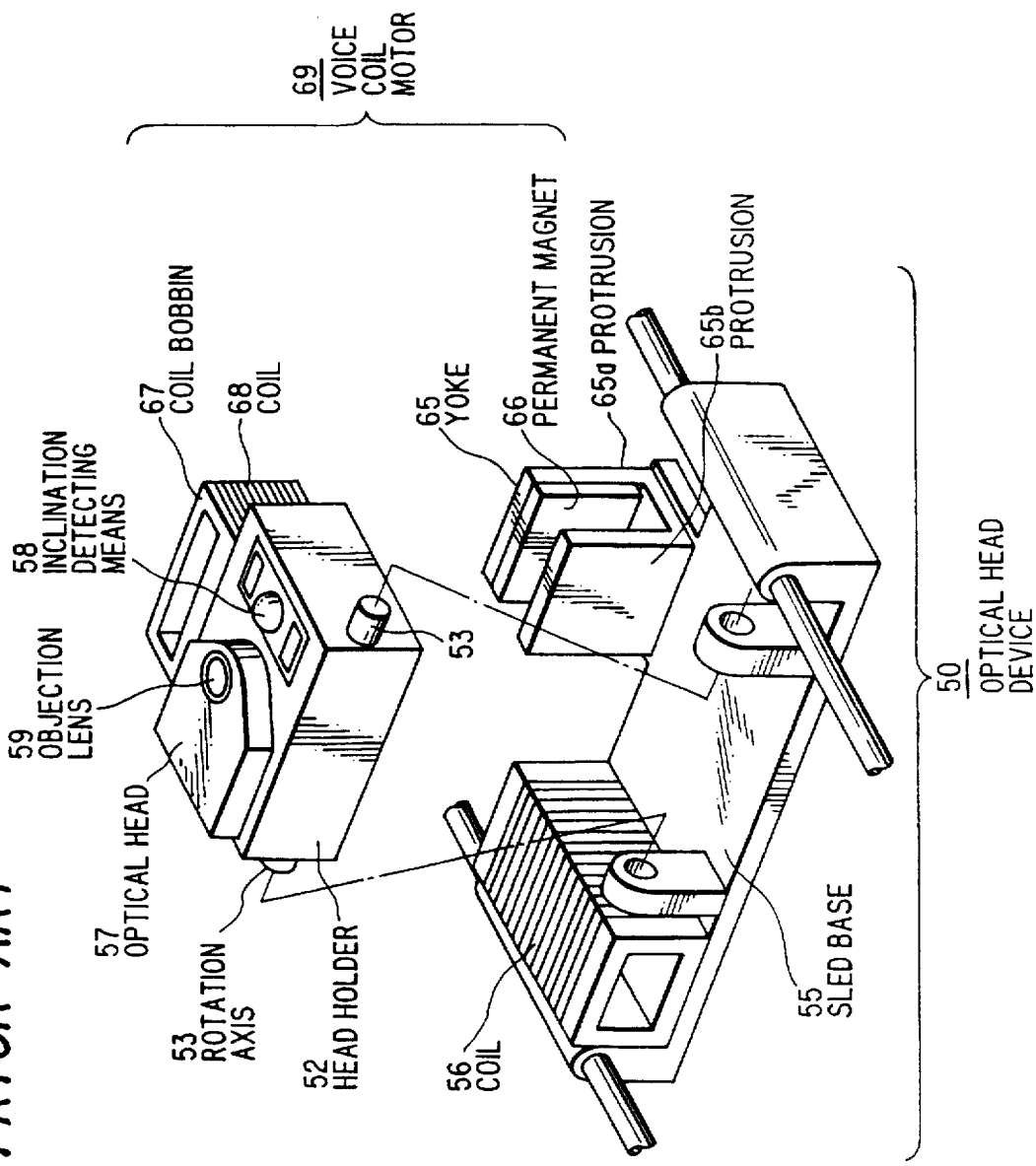
FIG. 1 is a perspective view showing a conventional optical head device.

FIG. 1 is a perspective view showing the conventional optical head device 50, which is in general implemented to optical disk devices.

The optical head device 50 comprises an optical head 57 which emits a light beam to an optical disk(not shown), a head holder 52 for holding the optical head 57, a sled base 55 which holds the head holder 52 rotatable around an axis approximately along the tangential line to a track of the optical disk and which functions as a base which reciprocatively moves along the radius direction of the optical disk, a tilt-driving voice coil motor 69 which energizes the rotation of the head holder 52 and an inclination detecting means 58 which detects an emission angle of a light beam to the recording surface of the optical disk.

The sled base 55 is slidable held by two guide rails and provided with a coil 55 which composes a radial-driving voice coil motor for energizing the sliding movement.

Above the upper surface(optical disk side) of the sled base 55, the head holder 52 is disposed, and it is supported rotatable around the axis along the tangential line to a track formed on the recording surface of the optical disk by rotation axes 53, 53 provided to the head holder 52.

The rotation axes 53, 53 are biasedly disposed on one end of the head holder 52, and the tilt-driving voice coil motor 69 for energizing the rotation movement pivoted on the rotation axes 53, 53 is disposed on the other end of the head holder 52. The tilt-driving voice coil motor 69 comprises a coil bobbin 67 which is fixed to the end of the head holder 52 and has an opening that extends in the vertical direction in FIG. 1, a coil 68 wound around the coil bobbin 67, a U-shaped yoke 65 which is vertically disposed at a position on the sled base 55 corresponding to the coil bobbin 67, and a permanent magnet 66 which is disposed attaching to one protrusion 65a of the yoke 65, wherein the other protrusion 65b of the yoke 65 is inserted through the opening of the coil bobbin 67 and the permanent magnet 66 and the protrusion 65a are placed opposite to the outer surface of the coil 68.

In operation, when the coil 68 is fed, the tilt-driving voice coil motor 69 energizes the coil bobbin 67 and coil 68 to move up and down along the direction that the opening of the coil bobbin 67 extends.

Further, the head holder 52 comprises the optical head 57, on the upper surface of which an objective lens 59 through which a light beam is emitted on the recording surface of the optical disk is provided. 58 indicates the inclination detecting means for detecting the inclination of the head holder 52 to the recording surface of the optical disk to control the light beam emitted from the optical head 57 to be perpendicular to the recording surface.

Figure 2A:
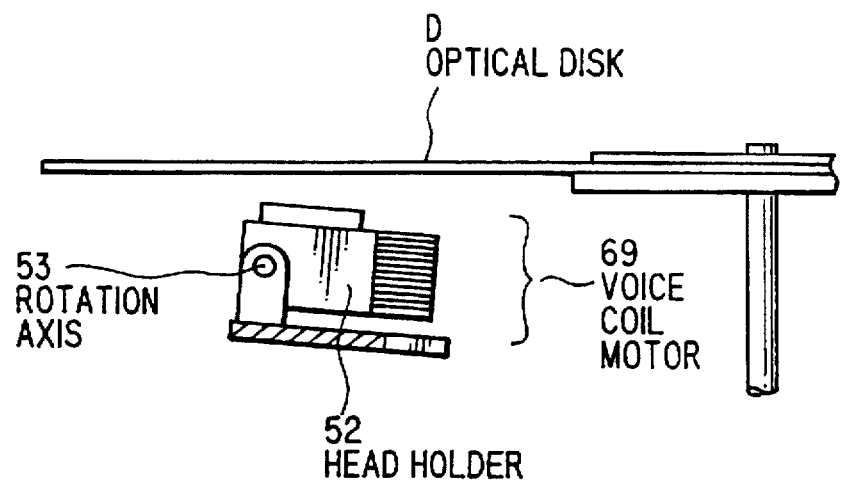
FIGS. 2A and 2B show the movement of the conventional optical head device.
Figure 2B:
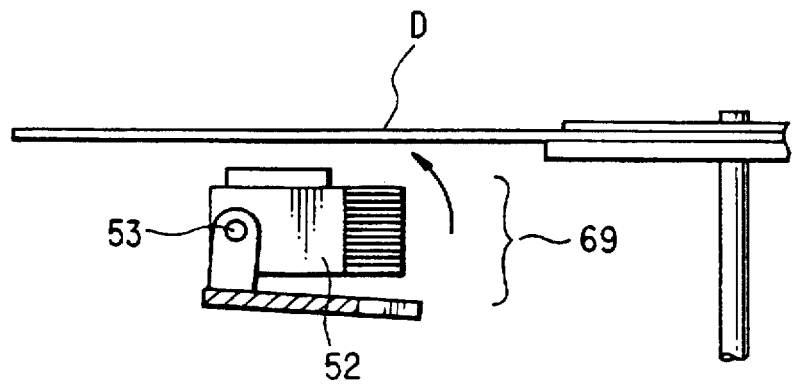

FIGS. 2A and 2B illustrate the movement of the conventional optical head device 50 in FIG. 1, where FIG. 2A shows a state before moving the optical head device 50 and FIG. 2B shows a state after moving the optical head device 50. For example, when the optical head 57 traces a track on the optical disk which is tilting down to the left: as shown in FIG. 2A, the inclination of the head holder 52 to the optical disk is detected by the inclination detecting means 58, and then the tilt-driving voice coil motor 19 works to rotate the head holder 52 in the direction indicated by an arrow in FIG. 2B to control the light beam emitted to be perpendicular to the recording surface of the optical disk.

Next, an optical head device in the preferred embodiment will be explained in FIG 3.

Figure 3:
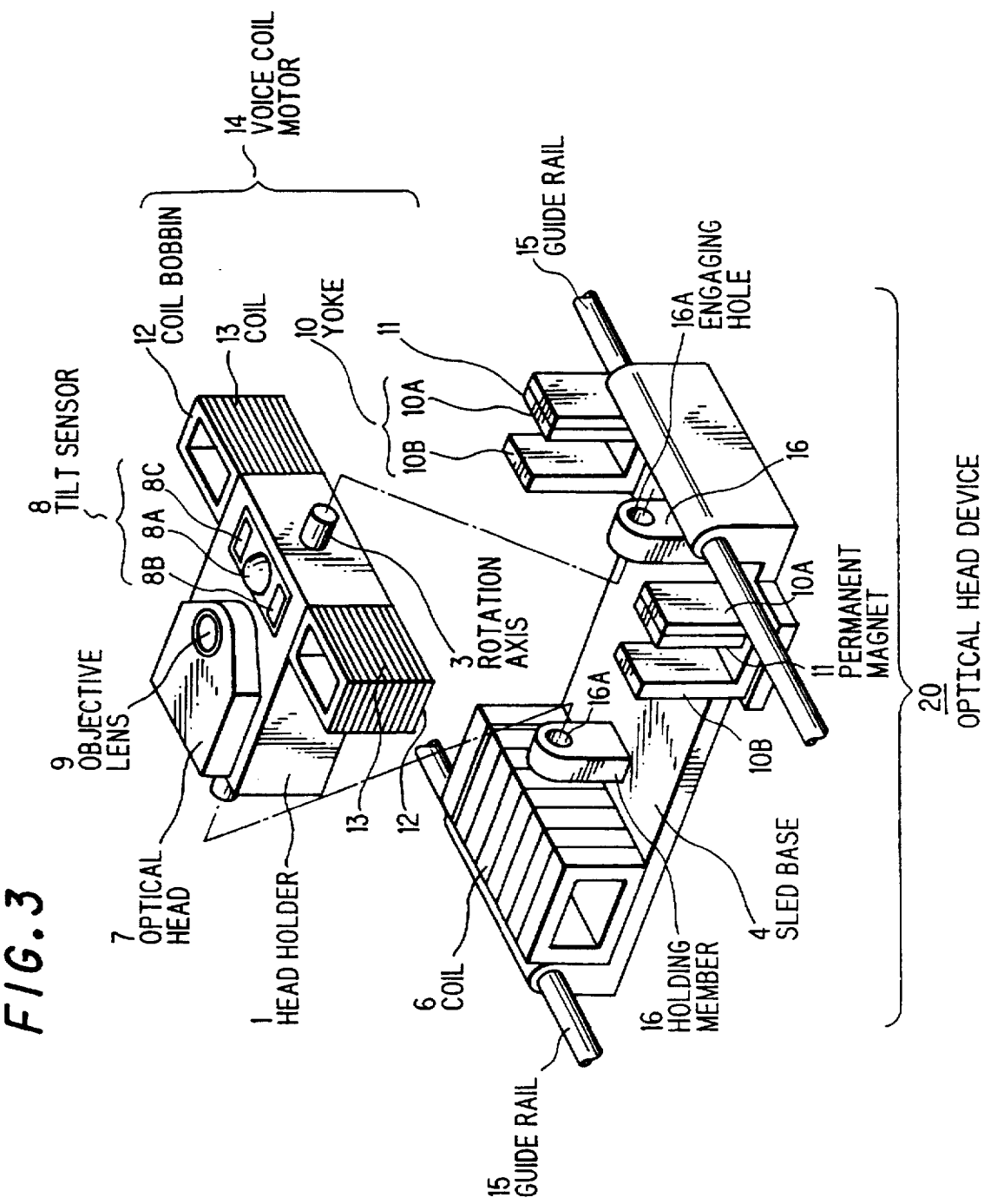
FIG. 3 is a perspective view showing an optical head device in a preferred embodiment according to the invention.

As shown in FIG. 3, the optical head device 20 comprises an optical head 7 which emits a light beam to an optical disk(not shown), a head holder 1 which holds the optical head 7, a sled base 4 which holds the head holder 1 rotatable around an axis approximately along the tangential line to a track of the optical disk and which functions as a base which reciprocatively moves along the radius direction of the optical disk, a rotation-energizing means(a pair of tilt-driving voice coil motors) 14 which energizes the rotation of the head holder 1 and an inclination detecting means(tilt sensor) 8 which detects an emission angle of a light beam to the recording surface of the optical disk.

The sled base 4, which is of a board member, is slidable held by two guide rails 15, 15 which are disposed along the radius direction of a track formed on the recording surface of the optical disk. Provided on its upper surface opposite to the optical disk is a coil 6 which composes a radial-driving voice coil motor as well as a side yoke, permanent magnet and center yoke(which are not shown) to energize the reciprocative movement along the guide rails 15, 15.

Also, on the upper surface of the sled base 4, holding members 16, 16 are formed which hold rotation axes 3, 3 of the head holder 1 rotatable. These holding members 16, 16 have engaging holes 16A, 16A through which the rotation axes 3, 3 are inserted. The engaging holes 16A, 16A lie on the same center axis which is disposed parallel to a tangential line to a track of the optical disk.

The head holder 1 is provided with the optical head 7 and held above the sled base 4 through the rotation axes 3, 3. The rotation axes 3, 3 are positioned on the same center axis and fixed to the head holder 1 in such a manner that the center axis passes through the center of gravity of the entire composition which includes the head holder 1 including the optical head 7 and the other fittings.

The optical head 7 is disposed on a surface of the head holder 1 which is opposite to the optical disk(hereinafter referred to as 'upper surface'), where a light beam is emitted from the optical head 7 to the recording surface of the optical disk and its reflected light is detected to read out information recorded on the optical disk. Also, the optical head 7 is provided with an objective lens 9 through which a light beam is emitted and a tracking actuator(not shown).

The objective lens 9 is positioned just over the center axis of the rotation axes 3, 3 so as to be close to the center axis above the head holder 1. The tracking actuator drives an optical system(not shown) so that a light beam converged upon the recording surface of the optical disk through the objective lens can trace a desired track on the optical disk.

At symmetrical positions as to the rotation axes 3, 3 of the head holder 1, i.e., right and left ends of the head holder 1 in FIG. 3, coil bobbins 12, 12 are disposed which have openings that extend through in the direction of approximately perpendicular to the recording surface of the optical disk. On the circumferences of the coil bobbins 12, 12, coils 13, 13 are wound such that the extending-through directions of the openings become the winding coil centers.

On the other hand, at positions on the sled base 4 corresponding to the coil bobbins 12, 12, there are provided two U-shaped yokes 10, 10 with protrusions 10A, 10B vertically disposed on the surface of the sled base 4, and permanent magnets 11, 11 are disposed attaching to the respective protrusions 10A, 10A. The other protrusions 10B, 10B are inserted through the openings of the corresponding coil bobbins 12, 12 and the permanent magnets 11, 11 and the protrusion 10A, 10A are placed opposite to the outer surfaces of the coils 13. In this state, the head holder 1 is held over the sled base 4.

As described above, each of tilt-driving voice coil motors 14, 14 as the rotation energizing means is composed of the coil bobbin 12, coil 13, yoke 10 and permanent 11. When the coils 13, 13 of the respective tilt-driving voice coil motors 14, 14 are fed, the rotation movement of the head holder 1 around the rotation axes 3, 3 is energized.

Also, on the upper surface of the head holder 1, there is provided a tilt sensor 8 as the inclination detecting means. The tilt sensor 8 comprises a light emitting diode 8A which emits a light beam to the recording surface of the optical disk and light receiving diodes 8B, 8C which detects the light beam reflected from the recording surface of the optical disk. The components of the tilt sensor 8 are disposed such that, when the light beam from the optical head 7 is perpendicular to the recording surface of the optical disk, detection outputs of the light receiving diodes 8B, 8C as to the reflected become equal.

The detection signals of the light receiving diodes 8B, 8C are output to a drive control means(not shown) in the optical head device. By feeding the coils 13, 13 of the tilt-driving voice coil motors 14, 14 depending on the detection signals of the light receiving diodes 8B, 8C through the drive control means, the light beam from the optical head 7 can be controlled to be always perpendicular to the recording surface of the optical disk.

Figure 4A:
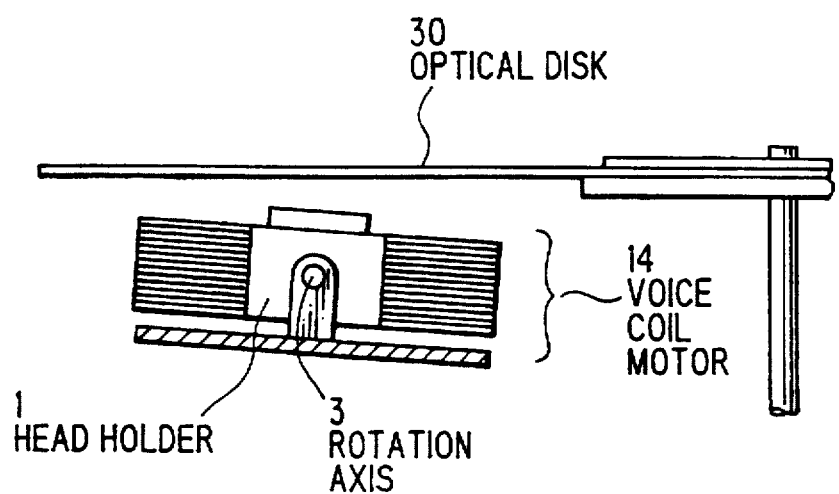
FIGS. 4A and 4B show the movement of the optical head device in FIG. 3.
Figure 4B:
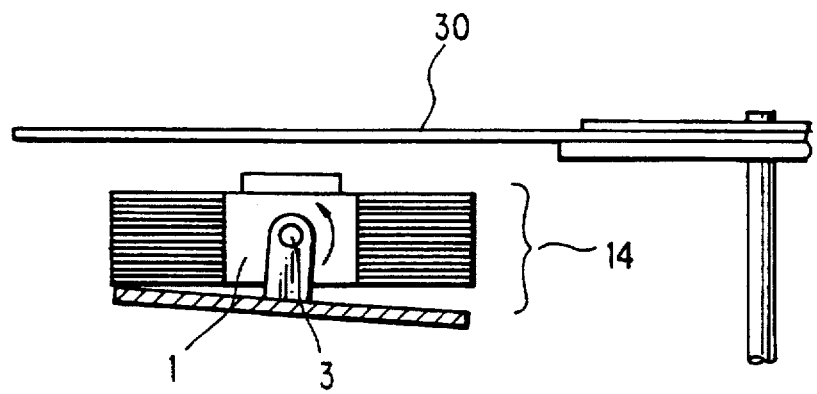

FIGS. 4A and 4B illustrate the movement of the optical head device 20 in this embodiment, where FIG. 4A shows a state before moving the optical head device 20 and FIG. 4B shows a state after moving the optical head device 20. For example, when the optical head 7 traces a track on an optical disk 30 which is tilting down to the left as shown in FIG. 4A, the inclination of the head holder 1 to the optical disk 30 is detected by the tilt sensor 8, and then the tilt-driving voice coil motors 14, 14 work to rotate the head holder 1 in the direction indicated by an arrow in FIG. 4B to control the light beam emitted to be perpendicular to the recording surface of the optical disk 30.

In the optical head device 20, the rotation axes 3, 3 are provided with the head holder 1 so that the center axis of the rotation axes 3, 3 passes through the center of gravity of the entire composition of the head holder 1 including its fittings. Therefore, the moment of inertia around the center axis as to the entire composition of the head holder 1 can be minimized.

Because of this, the output required of the tilt-driving voice coil motor 14 composing the rotation energizing means can be reduced, and the coil bobbin 12 and coil 13 can be thereby miniaturized. Also in case of having one tilt-driving voice coil motor, the rotation energizing means can be smaller and lighter than that of the conventional optical head device. Meanwhile, though the tilt-driving voice coil motor 14 in FIG. 3 is shown relatively enlarged for illustration, it can be more miniaturized. Further, since the output of the tilt-driving voice coil motor can be reduced, the consumed power in the rotation movement of the head holder 1 can also be reduced.

On the other hand, since the rotation axes 3, 3 are provided with the head holder 1 so that the center axis of the rotation axes 3, 3 passes through the center of gravity of the entire composition of the head holder 1 including its fittings, the entire composition of the head holder 1 can have a high resonance frequency. Therefore, the rotation movement of the head holder 1 can be performed with a high frequency. As a result, a quick rotation movement of the head holder 1 can be achieved.

Furthermore, since the tilt-driving voice coil motors 14, 14 are symmetrically disposed on both sides of the rotation axes 3, 3, the rotation movement of the head holder 1 can be balanced, thereby improving the stability and reliability in operation.

Also, since the objective lens 9 as the emitting site of a light beam is positioned just over the center axis of the rotation axes 3, 3 so as to be close to the center axis above the head holder 1, the variation of the distance from the recording surface of the optical disk to the emitting site can be decreased when the head holder 1 rotates. Therefore, the load in the focusing movement of the optical head 7 can be reduced, thereby achieving a quick focusing movement.

Namely, by implementing this optical head device to an optical disk device, a quicker read-out operation can be performed.

Meanwhile, the rotation energizing means is not limited to the two tilt-driving voice coil motors and may be composed of one of them.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical head device, comprising:

an optical head for emitting a light beam to an optical disk;

a head holder for holding said optical head;

a base member which reciprocatively moves said head holder along a radius direction of said optical disk while holding said head holder rotatable around an axis approximately along a tangential line and parallel to a track of said optical disk;

a rotation energizing means for energizing the rotation of said head holder; and an inclination detecting means for detecting an emission angle of said light beam to a recording surface of said optical disk;

wherein said head holder has a center axis for its rotation which passes through near a center of gravity of the entire composition of said head holder including said optical head.

2. An optical head device, according to claim 1, wherein:

said rotation energizing means comprises a pair of voice coil motors which are symmetrically disposed on both sides of said center axis.

3. An optical head device, according to claim 1, wherein:

said optical head has an emitting site of said light beam which is located near said center axis.

4. An optical head device, according to claim 2, wherein:

said optical head has an emitting site of said light beam which is located near said center axis.

* * * * *